United States Patent [19]
Brown et al.

[11] Patent Number: 6,047,066
[45] Date of Patent: *Apr. 4, 2000

[54] COMMUNICATION METHOD AND DEVICE

[75] Inventors: Daniel Peter Brown, Elmhurst; Louis David Finkelstein, Wheeling; Frank C. Pennypacker, Arlington Heights, all of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/131,302

[22] Filed: Aug. 10, 1998

Related U.S. Application Data

[63] Continuation of application No. 08/572,211, Dec. 13, 1995, Pat. No. 5,793,866.

[51] Int. Cl.[7] .......................................................... H04L 9/00
[52] U.S. Cl. .................................................. 380/2; 380/30
[58] Field of Search .................................... 380/2, 21, 30

[56] References Cited

U.S. PATENT DOCUMENTS

| | | | |
|---|---|---|---|
| 4,590,470 | 5/1986 | Koenig | 380/30 |
| 5,222,140 | 6/1993 | Beller et al. | 380/30 |
| 5,249,230 | 9/1993 | Mihm, Jr. | 380/30 |
| 5,335,278 | 8/1994 | Matchett et al. | 380/30 |
| 5,371,794 | 12/1994 | Diffie et al. | 380/30 |
| 5,402,490 | 3/1995 | Mihm, Jr. | 380/30 |
| 5,450,493 | 9/1995 | Maher | 380/30 |
| 5,793,866 | 8/1998 | Brown et al. | 380/2 |

FOREIGN PATENT DOCUMENTS

| | | |
|---|---|---|
| 2279540 | 1/1995 | United Kingdom . |
| 2279541 | 1/1995 | United Kingdom . |

*Primary Examiner*—Salvatore Cangialosi
*Attorney, Agent, or Firm*—Randall S. Vaas

[57] ABSTRACT

A system (100) and method of improving activation security allows a remote device (104) to identify that there is a difference between a first signal transmitted by a central site (102) and a first signal received by the remote device. A derived number is used. The derived number can be displayed to the user for verbal verification by the user, or the derived number can be used internally of the remote device, or the central site, for verification that is transparent to the user. A significant amount of security is added without substantially altering the communication protocol.

14 Claims, 5 Drawing Sheets

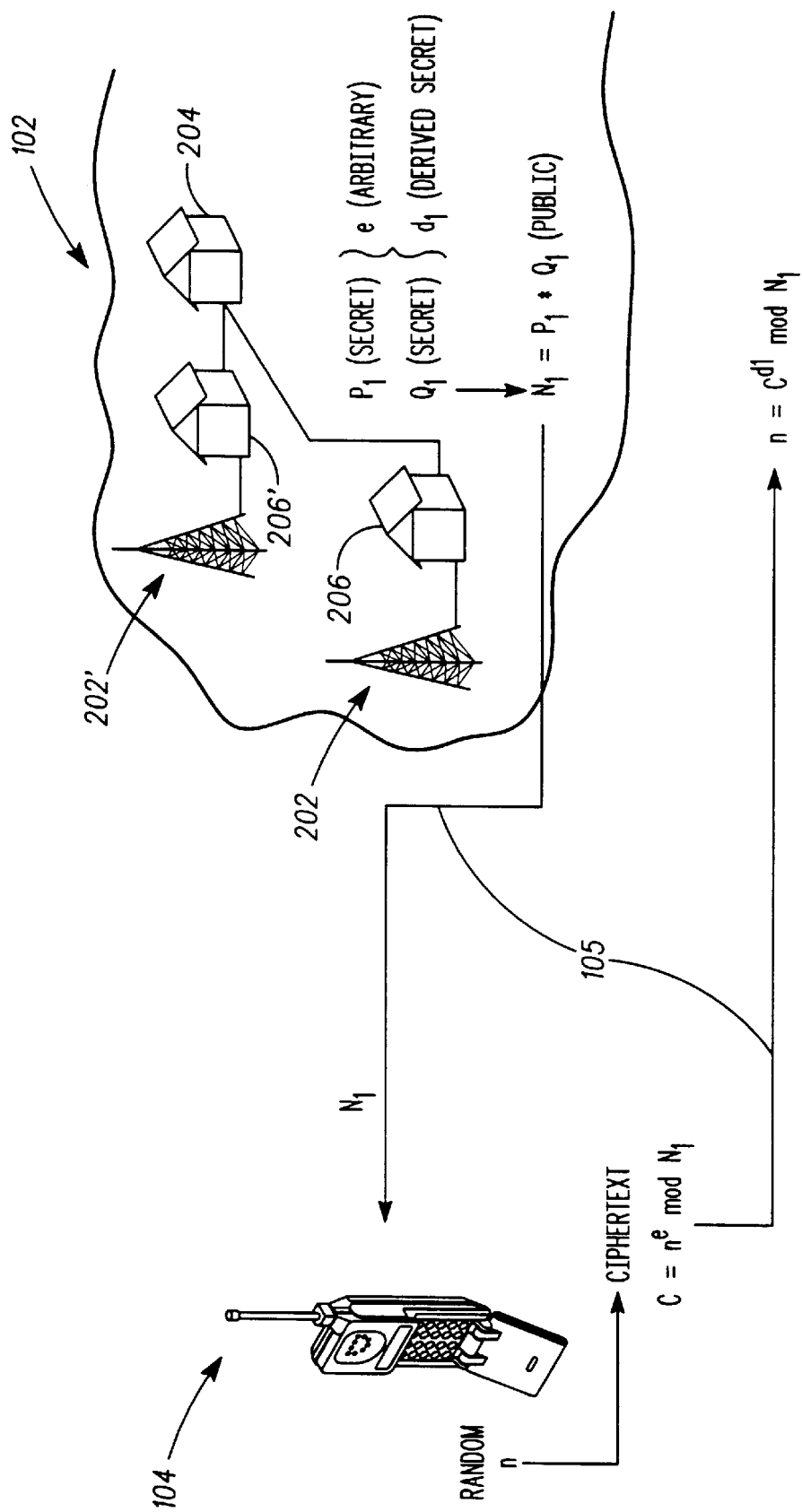
FIG. 3 —PRIOR ART—

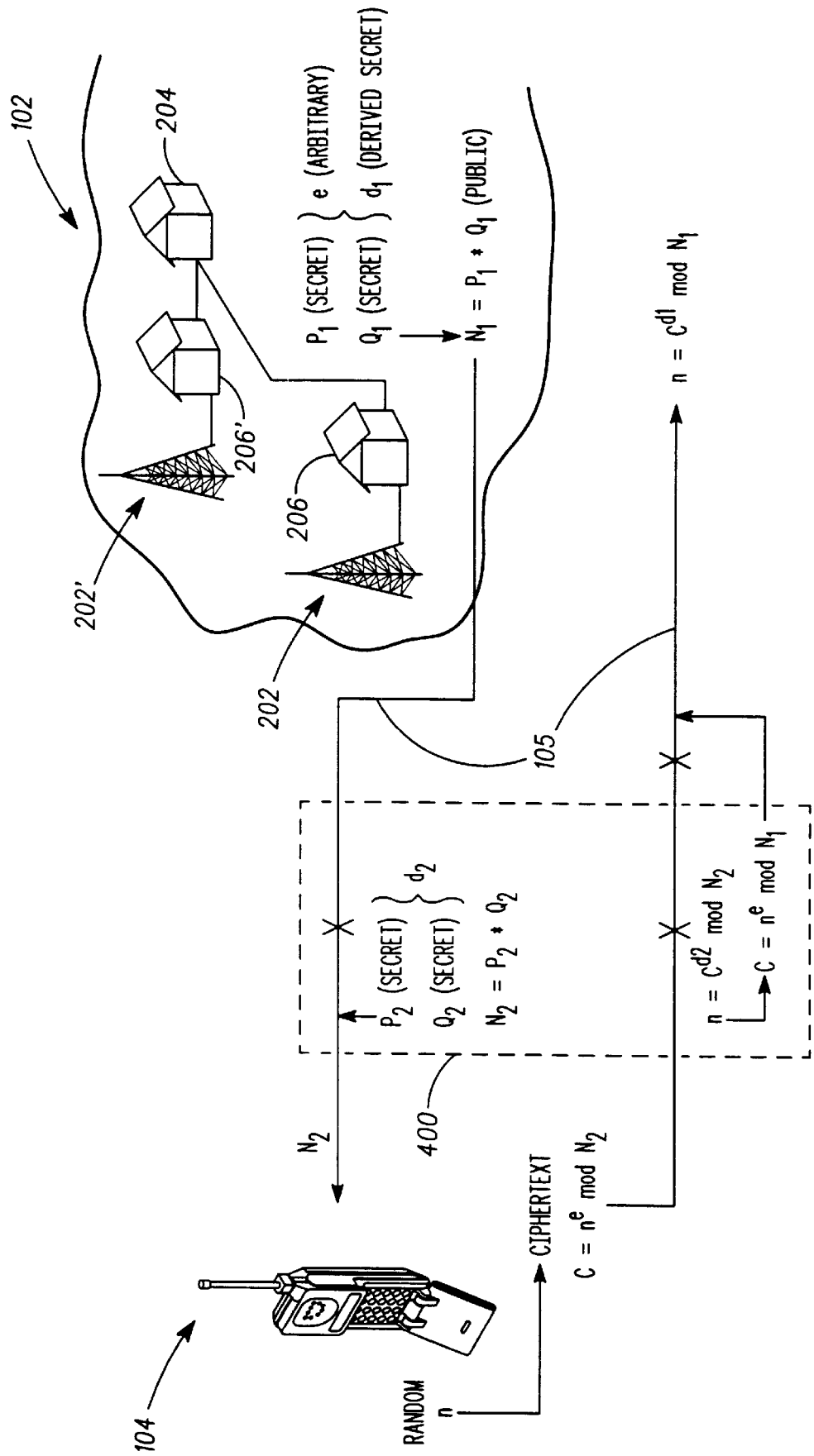
FIG. 4 —PRIOR ART—

COMMUNICATION METHOD AND DEVICE

The present application is a continuation of prior U.S. application Ser. No. 08/572,211, filed on Dec. 13, 1995 now U.S. Pat. No. 5,793,866, which is hereby incorporated by reference, and priority thereto for common subject matter is hereby claimed.

FIELD OF THE INVENTION

This present invention pertains to a secure system and a method therefor, and more particularly an improved system and method for monitoring a communication link.

BACKGROUND OF THE INVENTION

A device is personalized for subscription to a fee service by being provided with a unique identity upon initialization of the service. It is desirable to personalize the remote device from a central site in systems such as cellular telephone systems, cable telephone systems, networks and other communication systems, to ease distribution and provide flexibility in installation. It is further desirable to protect these credentials against interception during transmission to the legitimate device. For example, it is desirable to prevent "pirates" from downloading the credentials to other "blank" devices thereby enabling these other devices to masquerade as the legitimate device when accessing fee services.

One proposed solution to this fraud problem is for the service provider to give a secret number to each legitimate device upon activation of a fee subscription. Later, when the device attempts to gain system access, it must prove that it has the secret number without revealing it over the air. This process is called "authentication". Protocols for authentication exist in many systems. For example, cellular systems, including the Global System for Mobile Communications (GSM), the United States Digital Cellular (USDC) system, and the Digital European Cordless Telecommunications (DECT) systems, have such protocols. In these systems, the remote device is a phone.

One of the difficulties to be overcome when implementing authentication is the problem of providing the remote device with a secret number. In GSM, a smart card containing the secret number is given to the subscriber. The subscriber must physically insert it into the phone by means of a specially-designed slot. Although smart cards insure that the phone has the correct secret number, they introduce the need for a complex mechanical and electrical interface. Furthermore, it limits the size, form factor, and ultimately the cost, of the phone.

Another proposal is for the subscriber to manually enter the secret number into the remote device, such as a telephone handset using its keypad. This method has been slow to gain acceptance, due to a perceived user inconvenience. Additionally, many devices, such as cable boxes and pagers do not have a keypad. Requiring a keypad in such devices will increase their cost and possibly their size.

It has also been proposed to use remote service provisioning, such as "over-the-air" service provisioning (OTASP), to initialize a fee subscription service. By means of a suitable protocol, it is possible for a service provider to remotely program a blank remote device without any direct interaction by the service shop or retailer. One of the components of the information conveyed is the secret number, called the "A-key", used for authentication. The use of a public key exchange insures that the air, line or cable interface transactions are not vulnerable to simple eavesdropping and subsequent misuse of the secure information conveyed.

Although the public key exchange is impervious to simple interception, it is vulnerable to a so-called "man-in-the-middle" attack. In such an attack, an intruder breaks into the communications link at precisely the "right" time to read and insert messages. A successful man-in-the-middle can deceive both the phone and the service provider into thinking that they are talking to each other when in reality each side is talking to the intruder. If the man-in-the-middle attack is discovered, action can be taken to defeat the attack. Thus to succeed, the intruder must gain access to the "A-key" without the knowledge of either side.

It is desirable to provide protection by identifying the presence of an intruder in the communication link.

BRIEF DESCRIPTION OF THE DRAWINGS

FIG. 3 is a schematic illustrating a prior art cellular system activation protocol.

FIG. 4 is a schematic illustrating a cellular system according to FIG. 3 and including an intruder.

DETAILED DESCRIPTION OF THE PREFERRED EMBODIMENTS

A system and method of improving communication link security allows the subscriber device to verify reception of a first signal, which is at least a component of a public key, transmitted between a central site and a remote device. A derived number is used to verify reception. The derived number can be displayed for use in verbal verification, or the derived number can be used internally of the remote device and the central site, for verification that is transparent to the user. A significant amount of security is added without substantially altering the communication protocol.

Figure 1:
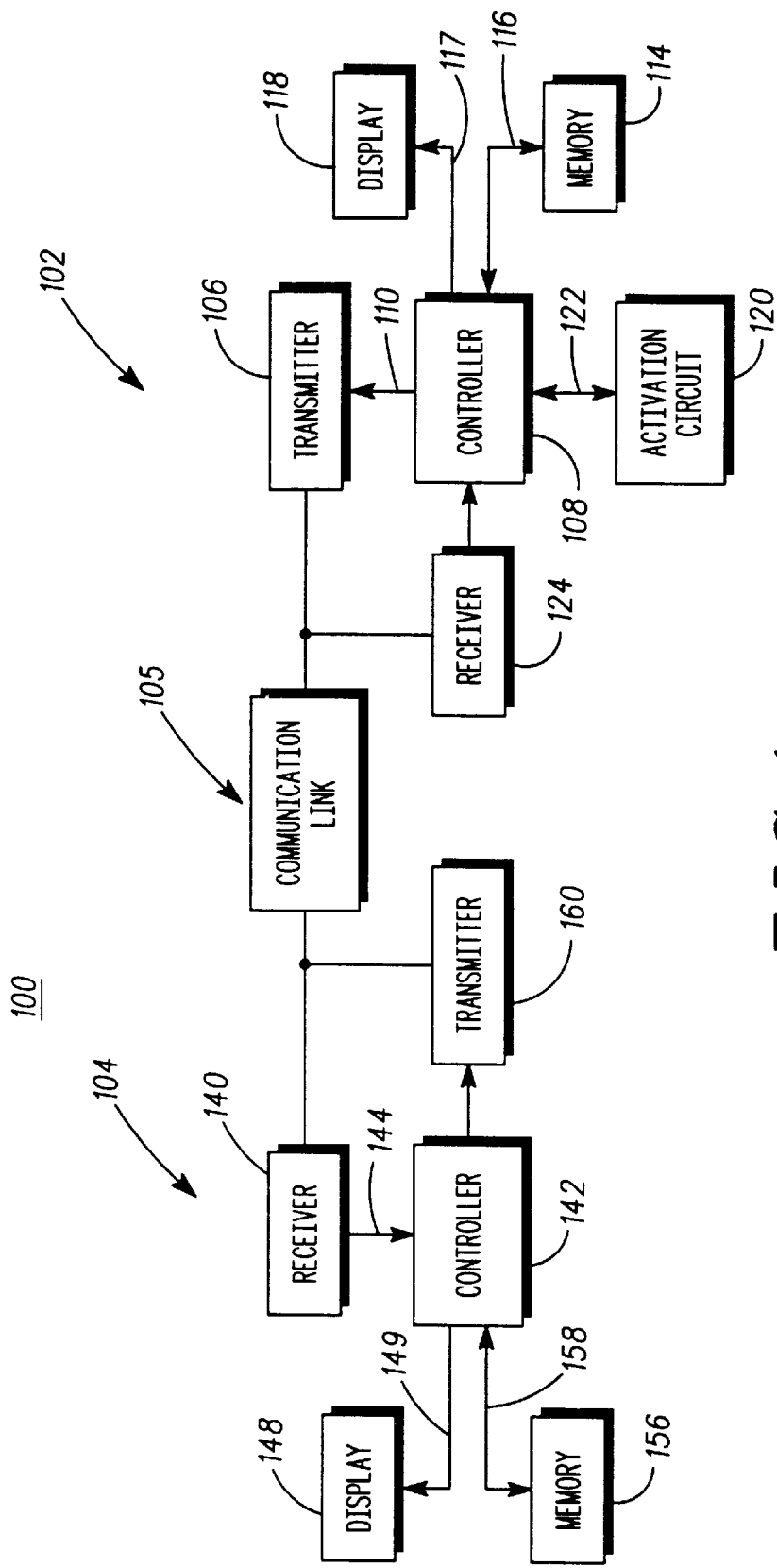
FIG. 1 is a system diagram illustrating a prior art remote device and central site.

A system 100 (FIG. 1) has a central site 102 and a remote device 104 that are coupled by a communication link 105. The central site 102 can be a base station, a service provider office, or a central switching center in a wireless communication system. Alternatively, it can be a switching office, a utility office, or a network server in a land-line cable or twisted wire communication system. In a two-way radio or pager system, the central site can be a base station, a fixed site, or another portable device. Accordingly, as used herein, "central site" refers to each of these or their equivalents.

The remote device 104 can be a telephone, a cable telephony interface device, a cellular radiotelephone, a cordless radiotelephone, a radio, a personal digital assistant (PDA), a pager, a palm-top computer, a personal computer, or other device which communicates with another compatible device. Accordingly, as used herein, remote device refers to each of these devices and their equivalents. The communication link 105 can be an RF link, a cable, twisted wires, an asynchronous transport mechanism (ATM), or the like, and "communication link" as used herein refers to each of these or their equivalents.

The present invention is advantageous in a system where devices communicate secure information. The present invention is particularly advantageous in a system employing an authentication key, or "A-key", or other secure number. A-keys and their derivatives are employed in such systems to provide access control and to establish secure means for transmission of user traffic. However, improved monitoring of security for an "over-the-air service provisioning" (OTASP) protocol by which a remote device is activated from a central site is highly desirable. In such environments it is desirable to protect against intruders, in order to reduce the risk that a subscriber's number will be given to a plurality of devices which will masquerade as the legitimate subscriber. If the intruder succeeds, the legitimate subscriber is likely to be billed for the masquerading party's use of the service.

System 100 includes a central site 102 and a remote device 104, coupled by a communication link 105. The central site 102 includes a transmitter 106 communicating signals to communication link 105. The transmitter 106 can be implemented using any suitable commercially available transmitter, such as an RF modulation circuit, a light source, or other commercially available communication device. The transmitter 106 is coupled to a controller 108 via conductor, or bus, 110. The controller outputs signals for transmission by transmitter 106. The controller is coupled to a memory 114 via a bus 116 and a display 118 via bus 117. The memory stores information used by the controller 108. The controller 108 is coupled to an activation circuit 120 via a conductor, or bus, 122. The activation circuit includes subscriber specific data, such as a serial number. The controller 108 may be implemented using any suitable commercially available microprocessor, computer, or the like. The activation circuit can be implemented using a data base, a personal computer, or a centralized computer system. A program controlling operation of the controller is stored in the memory 114, which may be a chip memory device, a floppy memory, a tape memory, or the like. The display is implemented using any suitable means such as a liquid crystal display, a light emitting diode display, a cathode display, or the like. The central site can also include a receiver 124 connected to controller 108 and communication link 105 for receiving signals from the communication link 105 and inputting them to the controller, thereby facilitating bi-directional communications.

The remote device 104 includes a receiver 140 coupled to communication link 105 and coupled to a controller 142 via conductor, or bus, 144. The receiver 140 is implemented using an RF receiver, a light sensitive device, or other means compatible with transmitter 106. The receiver demodulates signals, or otherwise converts signals received from communication link 105 into signals useable by controller 142. The controller 142 can be implemented using a microprocessor, a digital signal processor, a microcomputer, or the like. The controller 142 is coupled to a display 148 via a bus 149. The display is implemented using a cathode display, an LED display, a liquid crystal display, or other suitable display means. The controller controls display 148 to generate images for viewing by a user. The device need not have a display. A memory circuit 156 is connected to controller 142 via data bus 158. The memory stores an operating program for the controller and secure information received from the central site 102. The memory can be implemented using any suitable memory means, such as a chip EEPROM (electronically erasable read only memory), a tape memory, a disk memory or the like. The remote device can also include a transmitter 160 coupled between the controller 142 and the communication link 105 to transmit signals, thereby facilitating bidirectional communications.

In operation, the central site 102 communicates with a remote device 104 via signals transmitted on communication link 105. In existing fee for service systems, the remote device 104 is uniquely identified by an address or serial number. For example, a cable telephony interface device, or a mobile subscriber terminal, which may be a portable radiotelephone, a radiotelephone installed in a car, or any other class of cellular phone, have an electronic serial number (ESN) and a subscription identification (ID). At a minimum, the subscription ID is transmitted to the central site 102. This subscription ID is stored in the remote device memory 156 or in a portable memory which is inserted into the mobile subscriber terminal remote device 104. The central site uses this subscription ID for identification of the subscriber, and more specifically, for billing purposes. Accordingly, the subscription ID is intended for use in only one remote device.

Activation of the remote device 104 includes associating the electronic serial number, or address, with a particular subscriber. For this purpose, a telephone number and subscription ID are stored in the remote device, if they are not already loaded. This can take place at the service provider's facility, or from the central site 102 through the communication link 105. In cellular systems, this is referred to as "over-the-air service provisioning". As used herein, over-the-air service provisioning refers to activation of remote device from a central site regardless of whether communication is an RF wireless link, a cable, a network, a telephones system or the like.

A cellular OTASP system will now be described for illustrative purposes, as the invention is advantageous for this environment. A base station 202 (FIG. 2) is connected to a remote device 104 (a cellular telephone) through a communication link 105, which is an RF wireless link. The base station is in turn connected to the service provider central site 102 through a mobile switching office, or center, 206. A local public switched telephone network (PSTN) 208 is also connected to the mobile switching center 206. The service provider central site 102 facility includes a transceiver, having transmitter 106 and receiver 124, a controller 108, a memory 114, and a display 118.

The service provider, a central site, can also include a home location register (HLR), an authentication center (AC) and an over-the-air functionality (OTAF) for over-the-air service provisioning. It has become desirable for over-the-air service provisioning to provide the subscription ID to the remote device 104, a mobile subscriber in the cellular system. This allows the subscription ID to be down-loaded from the central site 102, the service provider facility, to the subscriber remote device 104. In the OTASP protocol, a subscriber purchases a "blank" remote device, which is a remote device having no subscription ID. This remote device can originate a special purpose call to any of several service providers (such as service provider central site 102) to request activation.

With reference to FIG. 3, once the base station 202 recognizes the special-purpose call on the control channel, the potential subscriber is routed through a voice channel to the service provider to exchange OTA messages between the service provider central site 102 and the mobile subscriber remote device 104. In a Rivest, Shamir, Adleman (RSA) embodiment, the public-key modulus N1 is transmitted to the remote device 104 from the service provider controller 108. N1 is the public modulus, and it is the product of P1 and Q1, two secret numbers stored in the memory 114 and having a known criteria. The remote device 104 responds to the modulus N1 by generating a ciphertext number C, which is a function of the modulus N1, a random number n generated by the remote device 104, and an arbitrary number e. The value of e is known to both the remote device 104 and the central site 102. The response C is sent from the device to the service provider. When the ciphertext number C is received by the service provider, it is decoded using the equation n=$C^{d1}$ mod N1, to determine n. The random number n is subsequently used to encrypt the authentication key, otherwise known as the A-key. The encrypted A-key is communicated to the remote device 104 from the service provider central site 102. Once the A-key is known to both parties, a series of messages are then exchanged between the central site 102 and the remote device 104 by which a security related variable called shared secret data (SSD) is mutually calculated by both the remote device 104 and the service provider central site 102. During over-the-air activation, the SSD is available for use in protecting user confidential information, such as credit card numbers. Each of the messages described in this paragraph is potentially vulnerable to a "man-in-the-middle" attack.

A man-in-the middle attack (FIG. 4) occurs when an intruder 400 inserts himself into the transmission path at the beginning of the first base station 202 to remote device 104 message. The intruder intercepts the base station modulus N1, replaces it with another modulus N2, and then passes this modulus N2 to the unsuspecting mobile subscriber remote device 104. The mobile subscriber remote device 104 sends a random number encrypted using the intruder's modulus N2 back to the intruder. Upon decryption, the intruder re-encrypts the random number n using the base station modulus N1 and passes this number to the base station 202. At this point, the remote device 104, the intruder 400 and the service provider central site 102, have the same randomly-generated number n. The intruder can remove himself from an active role in the base station-remote device communication link 105. The encrypted A-key can then be decrypted by both the remote device 104 and by the intruder. Likewise, the intruder can derive shared secret data (SSD) by eavesdropping on the communication link 105 and making use of the A-key. During OTASP, the intruder can obtain the subscriber ID using the A-Key and thereafter load it into other devices, thereby putting himself in a position to commit fraud against the service provider and the legitimate subscriber.

It is noted that a second base station 202' and mobile switching center 206' are shown in FIGS. 3 and 4 to illustrate a more complex system. It is also noted that although the task of splicing into and out of a signaling exchange is difficult in an RF environment, such as radiotelephone environment, it may be accomplished at some time. This is especially true if the attack need only last for a short time, as would be required for the modification of selected bursts. Further, for brevity, the remaining discussion will be of transmission of a derived value signal from central site 102 to the remote device 104, but it will be recognized that these roles can be reversed, and the derived value signal can be sent to the central site from the remote device.

Figure 2:
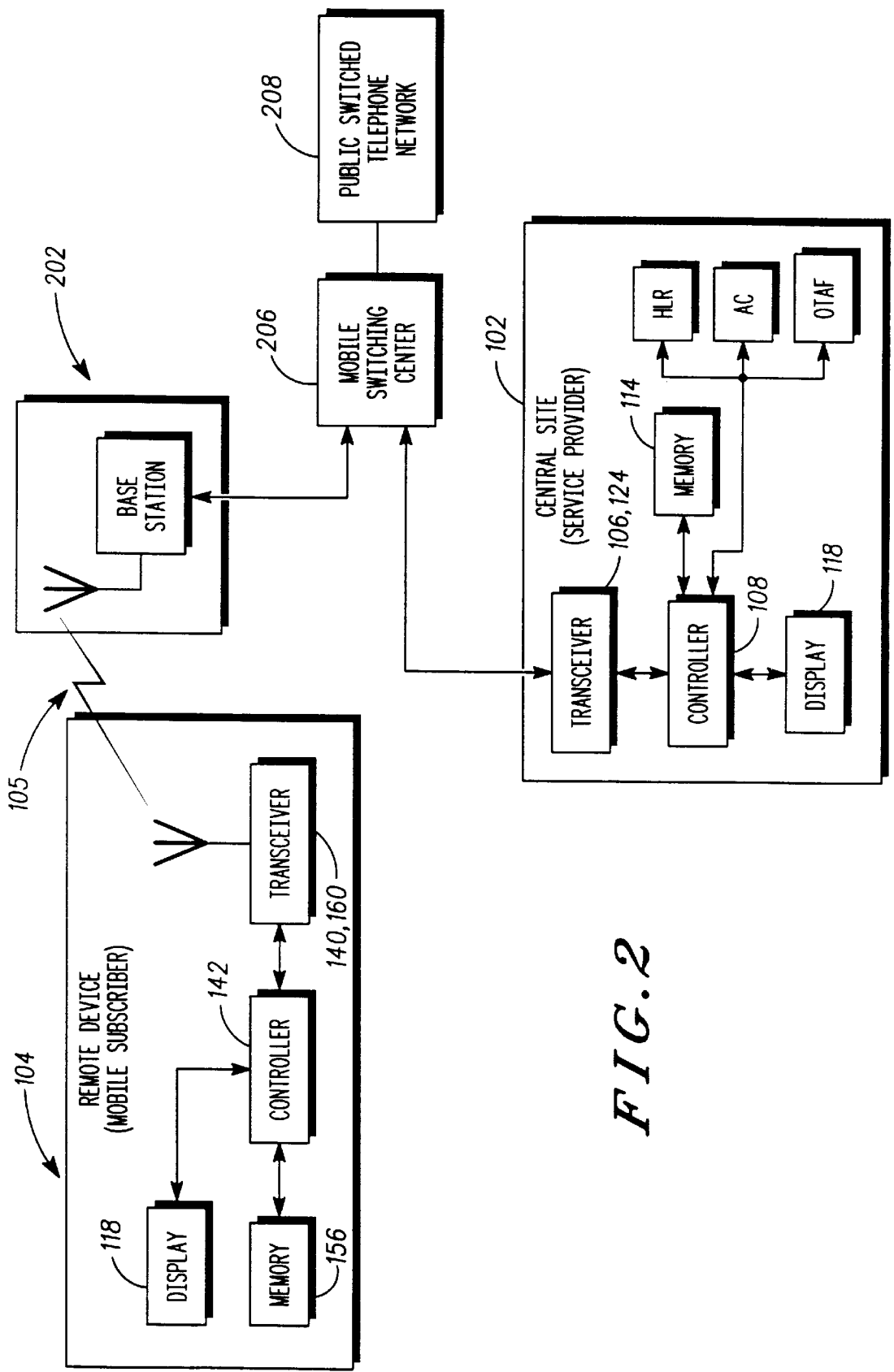
FIG. 2 is a system diagram illustrating a prior art cellular system.
Figure 5:
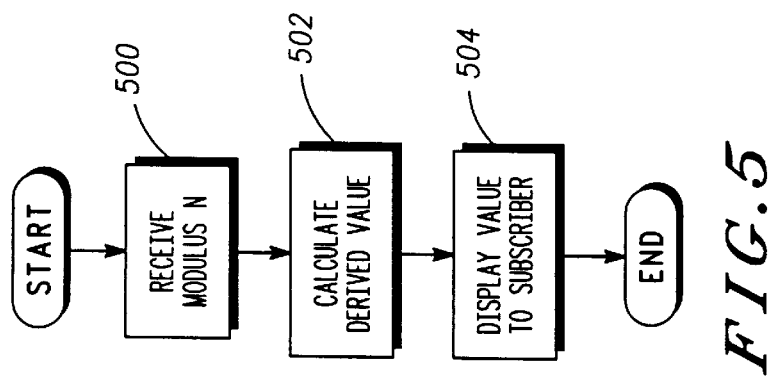
FIG. 5 is a flow chart illustrating operation of a remote unit.

To provide improved protection, the remote device 104 must be able to determine if it has received the same modulus N1 as transmitted by the service provider central site 102. One method of determining this is for the remote device 104 (FIG. 2) to perform a prescribed calculation on the received modulus, in order to generate and display a derived signal. The process is initiated, as shown in block 500 (FIG. 5), wherein the modulus is received by remote device 104. The controller 142 then generates a derived signal related to this received modulus, as indicated in block 502. The derived signal is shown in display 148, as indicated in block 504. For example, the controller 142 receives a modulus N, which is a long number, preferably having over five hundred characters. A character as used herein is a binary bit. The controller 142 then controls display 148 to display 7 to 12 alpha-numeric values related thereto, as indicated in block 504. Alternately, the alpha-numeric values may be converted into an audio signal output using a speaker (not shown). The 7 to 12 alpha-numeric values may be related to the first characters of the modulus, the last characters of the modulus, a hash of all the characters of the modulus, an exclusive OR of certain characters of the modulus, a CRC value of the modulus, a cryptographic check sum of the modulus, or may be of any other suitable relationship to the modulus. The mathematical relationship is predetermined and stored in the remote device 104 memory 156 (FIG. 2).

The controller 108 of the central site 102 likewise generates a number for display 118 having the same relationship to the modulus N1. The user can then read the characters on the display 148 to the service provider operator, who is simultaneously reading the display 118. If the numbers do not match, the OTASP process is aborted. This provides security since it will be difficult for the intruder to continue operating between remote device 104 and central site 102 and to mimic the voice of the subscriber without introducing a substantial delay period. It is likewise not feasible for the intruder to quickly generate a modulus different form N1 but producing the same derived number. A disadvantage of this method is that the user must communicate with a service provider operator, whereas it is desirable for the verification to be transparent to the user. Another disadvantage is that this method does not work in devices lacking a display or speaker system.

Figure 6:
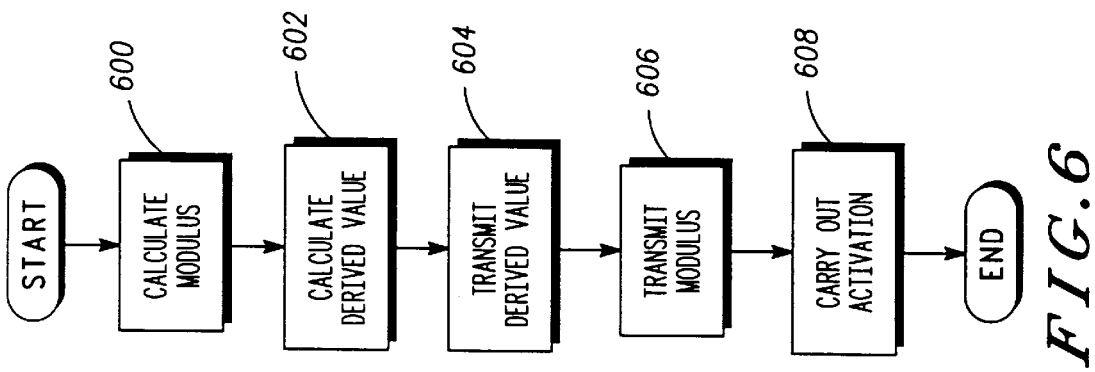
FIG. 6 is a flow chart illustrating operation of a central site.

One method of determining that the correct modulus has been received without the assistance of an operator and a display is to transmit a derived value to the remote device 104 from the central site 102. At the central site 102, a modulus signal N1 is calculated, as indicated in block 600 (FIG. 6). The central site 102 also calculates a derived value having a predetermined relationship to the modulus, as indicated in block 602. The modulus and the derived value are transmitted as indicated in blocks 604 and 606. The order of transmission of these signals is not important. The activation process is carried out, as indicated in block 608, unless an abort signal is received from the remote device 104. Activation includes transmission of an A-key and other signals according to the activation protocol.

Figure 7:
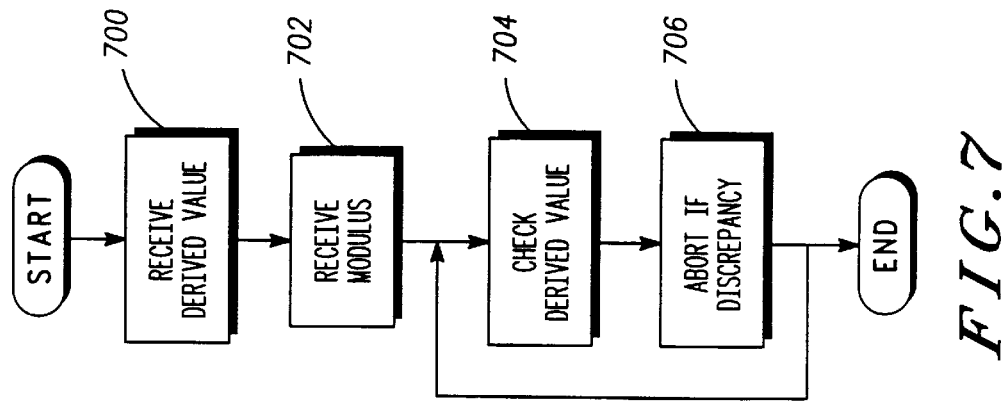
FIG. 7 is a flow chart illustrating operation of an alternate embodiment of the remote unit.

The remote device 104 performs verification functions. The remote device receiver 140 (FIG. 1) receives the derived value and the modulus, as indicated in blocks 700 (FIG. 7) and 702. The controller 142 monitors the communication link by checking the derived value against the modulus, as indicated in block 704. If the derived value does not have the predetermined relationship to the actually received modulus, the process is aborted, as indicated in block 706. The system can be arranged such that monitoring the link can be performed continuously or periodically. Monitoring can be performed prior to or throughout the authentication, or activation, process. If the process is aborted, an abort signal is communicated to the base station 202 and the subscriber may be instructed on the display 148 to contract the service provider central site 102. Security is provided because it is difficult for the intruder to find his own pair of modulus factors such that his derived value is equivalent to that of the service provider's modulus. Thus, only by changing the modulus factors can the intruder decrypt the number n and then obtain the authentication key. Without the authentication key, the intruder can not learn the subscription ID or other secret information. However, if the intruder changes the modulus, the derived value received from the central site will not bear the predetermined relationship to the intruder's modulus, and the device will flag the insertion of the intruder's modulus and abort the activation process.

The derived value can be transmitted globally, for use by all remote devices in communication with a base station 202. One message that can be used for this is a Global RAND (RAND being an abbreviation for a random or arbitrary number) in existing USDC telephone systems. The Global RAND is a number broadcast by a base station 202 to all mobile stations on the control channel. When the mobile subscriber remote device 104 is attempting system access, it will respond to this global challenge in order to perform an authentication function. The Global RAND is 32 bits in length, and is expected to change at least several times per hour.

Security is provided by specifying that a mathematical relationship exist between the service provider central site 102 generated modulus N1 and the global number. It is desirable, but not necessary, that the global number not change during the course of an OTASP protocol. The global number is transmitted to all remote devices before or after transmission of the modulus. The service provider central site 102 or the base station 202 generates the global message from N1, and the mathematical relationship of these numbers is known to the remote device 104 and the service provider central site 102. For example, the Global RAND can be the exclusive-or of 32 segments of N1, thereby providing the 32 bit number. Other mathematical relationships are equally feasible. Preferably a new Global RAND is generated at a rate of several times per hour, or once a minute. The global number is a function of N1, which in turn is a function of P1 and Q1. Those skilled in the art will recognize that P1 and Q1 are secret numbers generated according to known predetermined criteria, and that it is very difficult for an intruder to generate a suitable P1, Q1 and Global RAND meeting all the existing criteria for each these numbers.

During the process of over-the-air service provisioning, the remote device 104 verifies that the modulus N received on the voice channel from the base station 202 is related to the Global RAND previously detected on the control channel. If N and the Global RAND do not have the predetermined relationship, then the remote device 104 aborts the over-the-air service provisioning process. Since an intruder cannot regenerate the same modulus as the base station, his modulus will not be related to the Global RAND.

In an attempt to counter this improvement, a dedicated intruder might attempt to deceive the remote device by masquerading as a base station having a Global RAND that is related to the intruder's modulus N2. To do this, the intruder must "splice" into a control channel and replace the Global RAND on a relatively long-term basis to deceive a potential target remote device prior to the target user's attempt to access OTA services. However, this would cause other remote devices within range of the intruder station to try to perform call origination using the intruder's Global RAND after locking onto the false control channel. Any remote devices using the intruder's Global RAND for either origination or page responses would fail authentication and trigger an alarm at the master switching station. Thus, the intruder risks causing disruption of service to other remote devices and subsequent detection at the base station 202.

Two alternate embodiments are envisioned which use a device specific derived value. In the first alternate embodiment, a unique signal related to N1 and for a specific user is employed. An example of such a signal which is proposed for the US digital system, is the RANDSSD signal transmitted over the voice channel. The RANDSSD is a 56 bit number that is shared by a remote device and the authentication station, and is sent to the remote device 104 during over-the-air service provisioning. The remote device uses the RANDSSD to generate "Shared Secret Data" (SSD) in a known manner. This random number is preferably maintained throughout the OTA process to prevent the intruder from only having to stay in the link until the A-key is generated. Shared secret data is for use in authentication responses and session key generation of future connections. It is stored in the authentication center of the service provider central site 102 with the remote devices subscription ID. It is periodically updated, and may for example be updated after the user returns from a trip during which the unit has left their home zone, which is stored in the home zone register. Alternately, the SSD can be updated periodically, such as on a monthly or yearly basis.

To provide security to the OTASP process, the service provider central site 102 generates a RANDSSD having a predetermined mathematical relationship to the modulus N1. Again, this can be any suitable mathematical relationship, such as the exclusive-or of 32 segments of N1. The remote device determines if the RANDSSD has the predetermined relationship to the modulus N2 actually received by it. If the predetermined mathematical relationship does not exist between these numbers, the process is aborted.

Even if the intruder has successfully spliced into an OTA session and obtained an A-key by sending his own modulus N2 (FIG. 3), he can not avoid detection at the remote device 104 by simply passing along the RANDSSD from the central site 102 because the RANDSSD is related to N1, and not to N2. If the intruder derives his own version of RANDSSD, namely RANDSSD2, based on his N2, the SSD calculated at the remote device 104 from RANDSSD2 will not match the SSD derived from RANDSSD1 and stored in the central site 102 authentication center. In order to continue the charade, the intruder is forced to stay "in-the-middle" throughout the verbal portion of over-the-air service provisioning because two different session keys (one on either side of the intruder) will need to be maintained.

Additionally, a value of SSD derived from RANDSSD2 will cause the remote device 104 to generate an improper authentication response when it attempts authentication with the service provider central site 102. This results because the SSD stored in the remote device 104 is derived from RANDSSD2 whereas the SSD stored in the AC of service provider central site 102 is derived from RANDSSD1. In future communications, the remote device 104 will fail continue authentication when it attempts to access service without the intruder interceding. This alerts the service provider of a problem in authentication, and reactivation can be performed as a remedy.

The second alternate embodiment creates a mathematical relation between the modulus N1 and a session number used in a communication session, such as a seed for a session key. A session is the period between establishing and terminating a complete connection, such as the connection during which the over-the-air service provisioning process takes place, or the like. An example of a session number that may be used is a 32 bit RAND "re-authentication" number, a session seed transmitted over the voice channel in the USDC system. During re-authentication, the base station 202 (or service provider central site 102) and the remote device 104 generate a session key from the RAND re-authentication for use during the verbal component of over-the-air service provisioning. "Re-authentication" occurs after the SSD is generated.

In the USDC system, the remote device 104 checks to verify that the value of RAND re-authentication signal is related to N1. In other systems, where the session number is maintained throughout the session, the relationship can be periodically communicated and verified, and if at any time during the session the relationship is not met, the remote device aborts the process. The session number is terminated, or canceled, at the conclusion of the OTASP session.

If the intruder matches the RAND re-re-authentication signal to N2, he can get duplicate copies of a remote device 104 A-key and the resulting SSD. However, he is forced to maintain his position "in-the-middle" throughout the verbal component of OTASP because the session keys for the remote device 104 and the central site 102 will differ. Maintenance of this position may be extremely difficult in some communications environments.

It can be appreciate by those skilled in the art that other variable parameters employed in the OTASP protocol for USDC can be used as the derived value. For example, the unique base station challenge, RANDU, and the remote device generated challenge, RANDBS, are also available for use as the derived value. RANDU is issued to the remote device 104 after SSD is calculated. The remote device generates RANDBS in response to the command to update its SSD. Both the remote device 104 and the central site 102 will combine the RANDBS signal with the new value of SSD just created. This response from the remote device to the central site is used to confirm that the correct remote device updated its SSD. The central site 102 sends a response called AUTHBS to the remote device 104 to confirm that the updated SSD order originated from a legitimate central site.

The avoid detection when either the RANDU or the RANDBS signals are used as the derived value, the intruder needs to break into the communication link and force false messages twice. The first time is when the intruder intercepts N1 and transmits N2, receives the random number n from remote device 104, and retransmits n to the base station 202. The second time is when the intruder needs to intercept RANDU or RANDBS, respond to the sender, and carries on the second half of the subprotocol associated with each of RANDU and RANDBS. Security is improved because it will be difficult for the intruder to maintain a prolonged connection, or break in at exactly the right time to intercept the communications and derive appropriate modulus and derived values.

Regardless of the choice of parameter upon which to relate the derived number, the derived number can be advantageously composed of two parts to resolve the following conflicting requirements. It can be desirable to change the derived number very often, at least several times per hour. This is especially critical for the Global RAND, which is broadcast system wide. However, it takes a large amount of computation to generate a new modulus N, and it may only be possible to change it once a day, or even less often, to avoid overloading the control computer. The security of the system does not require frequent changes when a large modulus is used. If the random number is completely derived from the modulus according to a predetermined mathematical relationship, it cannot be changed more frequently than the modulus.

To avoid this conflict, the derived value consists of two portions. For instance, if the RANDSSD were to be used as the derived value, 40 bits can be derived from the modulus and 16 bits can be random numbers independent of the modulus. This allows 65,536 different random numbers to be generated from the same modulus. The modulus can then be changed rarely, while the random number can be changed often. Because it is very difficult for the intruder to find a new derived value that matches the 40 bits, security is provided. It will be recognized that the division of derived and random bits can be different. For example, 36 bits derived from the modulus and 20 bits random, or any other suitable division of the bits.

Those skilled in the art will recognize that the above RSA public key cryptography examples are not restrictive, as the methods disclosed may be applied to other techniques. For example, the methods may also be used to provide improved security in Diffie-Heliman (DH) public key cryptography. In DH techniques, a pair of signals are exchanged between the central site 102 and the remote device 104. Each of these signals would be the result of a calculation whereby a public "base" number is raised to a secret power, then divided by a publicly-known prime modulus N. More particularly, the base station 202 to remote device 104 communication includes $\alpha^{S1}$ mod N and the remote device to base station communication includes $\alpha^{S2}$ mod N. The values $\alpha$ and N are arbitrary and known to each party. An exchange of these numbers and subsequent combination of S1 and S2 results in the establishment of a common secret number between the two communicating parties. This common secret number is then available for use as a mask to encrypt the A-Key. The remainder of the OTASP protocol would then proceed as described above with respect to RSA. The invention employs a derived value signal related to $\alpha^{S1}$ mod N. It can be appreciated that the methods of this invention are equally effective when combined with the DH technique, the RSA technique, or other techniques. Thus, the "first number" as used herein refers to this number which is a component of the public key in a DH technique, the modulus N in the RSA technique which is a component of the public key, or any other public key, or component thereof, with which the present invention may be advantageously employed in other systems.

The above protocols of OTASP employ at least a component of a public key in the initial exchange, and more particularly, the examples as described utilize RSA or DH techniques. Other public key techniques can alternately be used. For example, elliptic curve public key can be used. It will also be recognized that elliptic curve cryptography can be used to implement the DH technique.

It is also envisioned that the derived value can be generated from a plurality of protocol parameters. For example, the derived value may be distributed among portions of RANDSSD and the RAND re-authentication number, or any other two signals communicated between the remote device and the central station.

Thus it can be seen that security is provided by verifying that the modulus N received by the remote device matches the modulus N transmitted by the central site 102. This security is provided using information that is communicated in existing service provisioning protocols. Thus, the protocol is not substantially altered by adding this security. Additionally, the security is provided in a manner which does not overload the system devices, and provides a high level of security that is transparent to the user.

We claim:

1. A method of monitoring a communication link between a central site and a remote device, for determining that an authentication key is securely communicated to the remote device when the remote device is not certified, comprising the steps of:

sending a first signal from the central site that is at least a component of a public key;

deriving a return signal as a function the at least a component of a public key;

sending the return signal from the remote device to the central site; and detecting an intruder at the central site if the base station does not receive a signal based on the shared number at the base station.

2. The method as defined in claim 1, wherein the shared number is stored in the central site with a subscription identification associated with the remote device.

3. The method as defined in claim 2, wherein the shared number is periodically updated by the central site.

4. The method as defined in claim 1, wherein the shared number is not secret.

5. The method as defined in claim 2, wherein the shared number is transmitted prior to the authentication session.

6. The method as defined in claim 1, wherein the derived number is a function of the authentication key and a random number.

7. The method as defined in claim 1, wherein the shared number is stored in the central cite and the remote device.

8. A method of over-the-air service provisioning of a remote device having an electronic serial number for communication on a communication link with a central site, characterized in that the operation of the remote device during establishment of an authentication key for use in communication with the remote device, includes the steps of:

receiving a first signal from the central site over the communication link, the first signal including at least a component of a public key;

deriving a return signal as a function of the received signal including that at least a portion of the public key; and sending the return from the remote device to the central site which return signal to be used to establish a common authentication key for the remote device and the central site, and wherein the return signal is derived as a function of a predetermined value whereby the base station can detect whether an intruder was present in the communication link during over-the-air service provisioning from the return signal.

9. The method as defined in claim 1, wherein the return signal identifies a shared number stored in the central site with a subscription identification associated with the remote device.

10. The method as defined in claim 2, wherein the shared number is periodically updated by the central site.

11. The method as defined in claim 1, wherein the shared number is not a secret.

12. The method as defined in claim 1, wherein the derived number is a function of the authentication key and a random number.

13. The method as defined in claim 1, wherein the shared number is stored in the central cite and the remote device.

14. The method as defined in claim 1, wherein the predetermined number is in a signal received from a broadcast by the central site.

\* \* \* \* \*